United States Patent
Zha

(10) Patent No.: US 10,228,585 B2
(45) Date of Patent: Mar. 12, 2019

(54) COLOR FILTER SUBSTRATE AND LIQUID CRYSTAL DISPLAY

(71) Applicant: WUHAN CHINA STAR OPTOELECTRONICS TECHNOLOGY CO., LTD., Wuhan, Hubei (CN)

(72) Inventor: Guowei Zha, Wuhan (CN)

(73) Assignee: WUHAN CHINA STAR OPTOELECTRONICS TECHNOLOGY CO., LTD., Wuhan, Hubei (CN)

(*) Notice: Subject to any disclaimer, the term of this patent is extended or adjusted under 35 U.S.C. 154(b) by 0 days.

(21) Appl. No.: 15/574,074

(22) PCT Filed: Jun. 22, 2017

(86) PCT No.: PCT/CN2017/089621
§ 371 (c)(1),
(2) Date: Nov. 14, 2017

(87) PCT Pub. No.: WO2018/205365
PCT Pub. Date: Nov. 15, 2018

(65) Prior Publication Data
US 2018/0329255 A1 Nov. 15, 2018

(30) Foreign Application Priority Data
May 12, 2017 (CN) .......................... 2017 1 0335303

(51) Int. Cl.
*G02F 1/1335* (2006.01)
*G02F 1/1333* (2006.01)

(52) U.S. Cl.
CPC .. *G02F 1/133514* (2013.01); *G02F 1/133512* (2013.01); *G02F 1/133528* (2013.01); *G02F 1/133553* (2013.01); *G02F 2001/133357* (2013.01)

(58) Field of Classification Search
None
See application file for complete search history.

(56) References Cited

U.S. PATENT DOCUMENTS

2017/0307932 A1* 10/2017 Lee .................. G02F 1/133512

* cited by examiner

*Primary Examiner* — Richard H Kim
(74) *Attorney, Agent, or Firm* — Hauptman Ham, LLP

(57) ABSTRACT

A color filter substrate and a liquid crystal display are provided. The color filter substrate has a substrate, a light shielding array and a plurality of color resist units. A projection of the light shielding array on the substrate and a projection of the color resist units on the substrate are connected to each other without intersecting each other. The light shielding array has a plurality of light reflecting units and a plurality of light absorbing units. The light reflecting units are configured to reflect light and are disposed on disposed above the substrate, and the light absorbing units are configured to absorb light and disposed on the light reflecting units.

5 Claims, 6 Drawing Sheets

COLOR FILTER SUBSTRATE AND LIQUID CRYSTAL DISPLAY

CROSS REFERENCE TO RELATED APPLICATION

This present application is a national stage filing under 35 U.S.C § 371 of PCT application number PCT/CN2017/089621 filed on Jun. 22, 2017, which is based upon and claims the benefit of priority to the Chinese Patent Application No. 201710335303.2 filed on May 12, 2017 in the Korean Intellectual Property Office. The disclosures of the above-listed applications are hereby incorporated by reference herein in their entirety.

FIELD OF THE INVENTION

The present invention relates to the field of liquid crystal display panels, especially to a color filter substrate and liquid crystal display.

BACKGROUND OF THE INVENTION

In modern society reliance on information, the importance of displays as a medium for information transmission is further increased. To have a leading status in the future, displays are developed consistent with the trends of being lighter, thinner, and lower power consuming, more inexpensive, and having better graphic quality.

Core display technologies is to reproduce human eye perception to the real world. Mainstream display technologies comprise the liquid crystal display (LCD) and organic light-emitting diode (OLED) has different advantages in color reduction, viewing angle, contrast, brightness and darkness dynamic range control and reliability. LCD display technologies have longer development history and have advantages of mature manufacturing processes, lower cost, and high reliability, etc. However, when compared to the self-illuminating OLED display technologies, brightness of the pixels of an LCD cannot be controlled by adjusting an individually pixel. Primary principle of the LCD is providing illumination by the entire backlight unit or a large area of the backlight unit. Then liquid crystals are controlled and driven by thin film transistors (TFTs) as light gates to adjust brightness of each pixel. In any one displayed screen, the entire backlight unit or the large area of the backlight unit must light up to provide illumination, and then an observable displayed screen is eventually formed sequentially through a polarizer, an array substrate, a liquid crystal layer and a color filter substrate. Power consumption of the backlight unit is about 80% of the full power consumption of the display of the entire display panel. However, over 90% of light is blocked or absorbed instead of being contributed to the brightness of the display, which causes the LCDs to lose advantages of system power efficiency when compared to OLEDs. In the predictable future, LCD technologies will face critical challenges owing to constant improvement of quantum efficiency of light-emitting elements of the OLEDs and will need breakthrough.

Improvements are carried out according to each of the aforementioned aspects. In the aspect of polarizers, reflective polarizers are adopted to increase transmittance rate. Liquid crystal layers are primarily improved by adopting high light permeable liquid crystals and new type of electrodes. Color resists are primarily improved by adopting specific backlight spectrums. However, the metal electrodes of the array substrate are hard to replace with transparent electrodes with high resistance rate. The light shielding array on a side of the color filter substrate configured to prevent color crosstalk and improving color bias under a large viewing angle requires another improving ways.

Therefore, the conventional technologies are defective and need improvement urgently.

SUMMARY OF THE INVENTION

The objective of the present invention is to provide an improved color filter substrate and an improved liquid crystal display.

To solve the above issues, the present invention provides technologic solutions as follows.

The present invention provides a color filter substrate, which comprises: a substrate; a light shielding array and a plurality of color resist units disposed above the substrate along a direction parallel to the substrate, wherein a projection of the light shielding array on the substrate and a projection of the color resist units on the substrate are connected to each other without intersecting each other; wherein the light shielding array comprises a plurality of light reflecting units and a plurality of light absorbing units, the light reflecting units are configured to reflect light and are disposed above the substrate, and the light absorbing units are configured to absorb light and are disposed on the light reflecting unit.

In some embodiments, the light shielding array is located on the substrate, the color resist units are located on the substrate, and the light shielding array spaces the color resist units apart from each other.

In some embodiments, a first planarization layer is disposed on the light shielding array and the color resist units.

In some embodiments, a thickness of the color resist units is greater than a thickness of the light shielding array.

In some embodiments, the color resist units are located on the substrate, and two of the color resist units adjacent to each other define an interval therebetween, such that a plurality of interval regions are formed between the color resist units; a second planarization layer is disposed on the substrate, and the second planarization layer covers the color resist units and the interval regions; the light shielding array is located on the second planarization layer and covers the interval regions; and a third planarization layer is disposed on the light shielding array and the second planarization layer.

In some embodiments, preparation material of the light absorbing units is light absorbing metal oxide.

In some embodiments, preparation material of the light absorbing units is light absorbing photoresist.

In some embodiments, the color resist units comprise a plurality of red color resist units, a plurality of green color resist units and a plurality of blue color resist units sequentially arranged along the direction parallel to the substrate.

In some embodiments, preparation material of the light reflecting units is high reflection metal material.

Accordingly, the embodiment of the present invention further provides a color filter substrate, which comprises: a substrate, a light shielding array disposed above the substrate, and a plurality of color resist units disposed above the substrate and spaced apart from each other by the light shielding array; wherein the light shielding array comprises a plurality of light reflecting units and a plurality of light absorbing units, the light reflecting units are configured to reflect light and are disposed on the substrate, the light absorbing units are configured to absorb light and are disposed on the light reflecting unit.

In some embodiments, a first planarization layer is disposed on the light shielding array and the color resist units.

In some embodiments, a thickness of the color resist units is greater than a thickness of the light shielding array.

In some embodiments, preparation material of the light absorbing units is light absorbing metal oxide.

In some embodiments, preparation material of the light reflecting units is high reflection metal material.

In some embodiments, the color resist units comprise a plurality of red color resist units, a plurality of green color resist units and a plurality of blue color resist units arranged sequentially along a direction parallel to the substrate.

Accordingly, the embodiment of the present invention also provides a liquid crystal display which comprises:

a backlight module;

a color filter substrate located on a side of the backlight module having a light emitting surface, and a first polarizer disposed between the color filter substrate and the backlight module;

a liquid crystal layer located on a side of the color filter substrate away from the backlight module;

an array substrate located on a side of the liquid crystal layer away from the color filter substrate, and a second polarizer disposed on a side of the array substrate away from the liquid crystal layer;

wherein the color filter substrate comprises: a substrate, a light shielding array and a plurality of color resist units disposed above the substrate along a direction parallel to the substrate, wherein a projection of the light shielding array on the substrate and a projection of the color resist units on the substrate are connected to each other without intersecting each other; wherein the light shielding array comprises a plurality of light reflecting units and a plurality of light absorbing units, the light reflecting units are configured to reflect light and are disposed above the substrate, the light absorbing units are configured to absorb light and are disposed on the light reflecting unit;

wherein the backlight module is located close to a side of the color filter substrate having the substrate such that the light reflecting units of the color filter substrate are able to reflect back light emitted from the backlight module to surfaces of the light reflecting units.

In some embodiments, the light shielding array is located on the substrate, the color resist units are located on the substrate, and the light shielding array spaces the color resist units apart from each other.

In some embodiments, a first planarization layer is disposed on the light shielding array and a plurality of color resist units, and a thickness of the color resist units is greater than a thickness of the light shielding array.

In some embodiments, the color resist units are located on the substrate, and two of the color resist units adjacent to each other define an interval therebetween, such that a plurality of interval regions are formed between the color resist units; a second planarization layer is disposed on the substrate, and the second planarization layer covers the color resist units and the interval regions; the light shielding array is located on second planarization layer and covers the interval regions; and a third planarization layer is disposed on the light shielding array and the second planarization layer.

In some embodiments, preparation material of the light reflecting units is high reflection metal material In comparison to a conventional color filter substrate, a color filter substrate provided by the embodiment of the present invention comprises: a substrate, a light shielding array and a plurality of color resist units disposed above the substrate along a direction parallel to the substrate, a projection of the light shielding array on the substrate and a projection of the color resist units on the substrate are connected to each other without intersecting each other; wherein the light shielding array comprises a plurality of light reflecting units and a plurality of light absorbing units, the light reflecting units are configured to reflect light and disposed above the substrate, the light absorbing units are configured to absorb light and are disposed on the light reflecting unit. The solution designs the light shielding array into a structure having a light reflective surface and a light absorptive surface such that a part of light emitted from the backlight module when passing through the light shielding array are reflected again into the backlight system. Therefore, the light is recycled and used to lower consumption of the backlight and increase usage rate of the backlight resources.

DETAILED DESCRIPTION OF THE PREFERRED EMBODIMENTS

Figure 1:
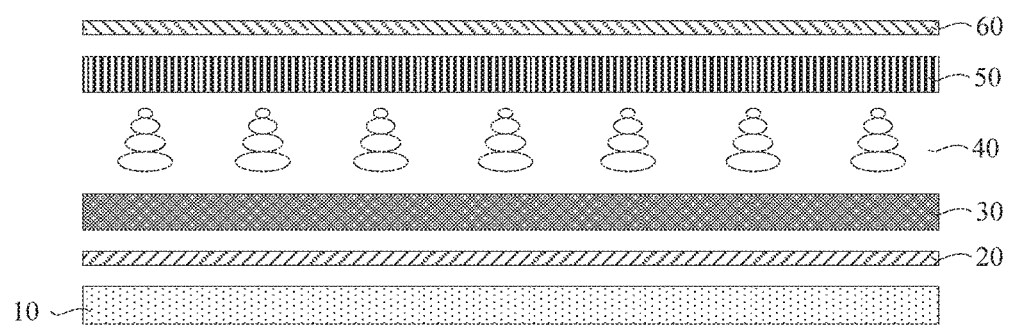
FIG. 1 is a schematic structural view of a liquid crystal display of a preferred embodiment of the present invention.

The following descriptions for embodiments refer to the accompanied figures for illustrating specific embodiments to which the present invention is applied. Directional terminologies mentioned by the present invention, for example "upper", "lower", "front", "rear", "left", "right", "inner", "outer", "side", etc. only refer to directions of figures. Therefore, the used directional terminologies are for explanation and understanding of the present invention instead of limiting the present invention.

In the figures, modules similar in structures are marked with identical reference numeral.

Furthermore, terminologies "first", "second" are merely used for purposes of description instead of being understood as an indication or implication of comparative importance or the number of the feature referred to. therefore, the feature limited by "first" or "second" may indicate or imply one or more of such feature. In the description of the present invention, unless an explanation else is presented, "a plurality of" means two or more. Furthermore, terminology "comprise" and any variants thereof mean to cover the nonexclusively including.

With reference to FIG. 1, FIG. 1 is a schematic structural view of a liquid crystal display of a preferred embodiment of the present invention. As shown in FIG. 1, the liquid crystal display of the preferred embodiment comprises:

A backlight module 10;

A color filter substrate 30 located on a side of the backlight module 10 having a light emitting surface 11, a first polarizer 20 disposed between the color filter substrate 30 and backlight module 10;

A liquid crystal layer 40 located on a side of the color filter substrate 20 away from the backlight module 10;

An array substrate 50, located on a side of the liquid crystal layer 40 away from the color filter substrate 20, and a second polarizer 60 disposed on a side of the array substrate 50 away from the liquid crystal layer 40.

Figure 2:
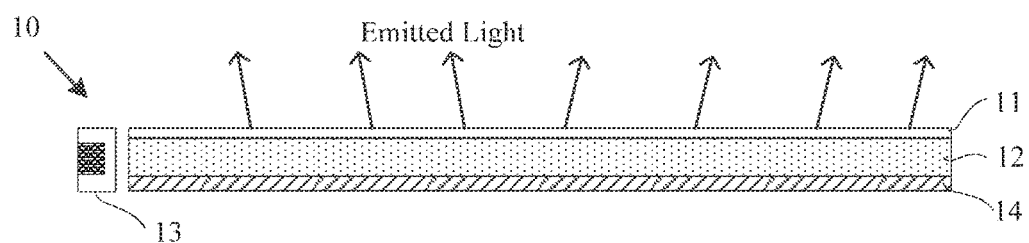
FIG. 2 is a schematic structural view of a backlight module of the preferred embodiment of the present invention.

In some embodiments, with reference to FIG. 2, FIG. 2 is a schematic structural view of the backlight module of the preferred embodiment of the present invention. As shown in FIG. 2, the backlight module 10 comprises a light guide 12, a light source 13 disposed on a side of the light guide 12 and a reflective plate 14 disposed on a rear of the light guide 12. The light emitting surface 11 of the backlight module 10 is located on a side of the light guide 12 away from the reflective plate 14.

The light source 13 may be a light emitting diode (LED).

In some embodiments, the first polarizer 20 basically comprises: a polyvinyl alcohol (PVA) layer in the middle, two Tri-cellulose Acetate (TAC) layers, a pressure sensitive adhesive (PSA) film, a release film and a protective film. Polarization effect is provided by the PVA layer. However, the PVA layer hydrolyze s easily. To protect the physical characteristics of the polarization film, the two TAC layers with high light transmittance rate, excellent waterproof performance and sufficient mechanical strength are composited on both sides of the PVA layer for protection.

Accordingly, the second polarizer 60 basically comprises: a PVA layer in the middle, two TAC layers, a PSA film, a release film and a protective film.

Figure 3:
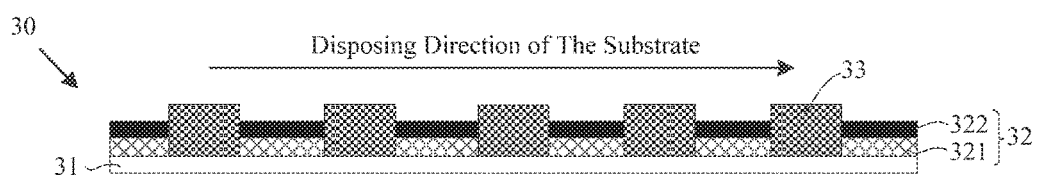
FIG. 3 is a schematic structural view of a color filter substrate of the preferred embodiment of the present invention.

With reference to FIG. 3, FIG. 3 is a schematic structure view of a preferred embodiment of the present invention. As shown in FIG. 3, in the embodiment of the present invention, the color filter substrate 30 comprises a substrate 31, a light shielding array 32 and a plurality of color resist units 33 disposed above the substrate 31 along a direction (disposing direction) parallel to the substrate 31. A projection of the light shielding array 32 on the substrate 31 and a projection of the color resist units 33 on the substrate 31 are connected without intersecting each other. The light shielding array 32 comprises a plurality of light reflecting units 321 and a plurality of light absorbing units 322. The light reflecting units 321 are configured to reflect light and are disposed above the substrate 31, a plurality of light absorbing units 322 are configured to absorb light and are disposed on the light reflecting unit 321.

In the embodiment of the present invention, the backlight module 10 is located close to a side of the color filter substrate 30 having the substrate 31 (in other words, the light reflecting units 321 are located close to a side of the backlight module 10, and the light absorbing units 322 are located close to a side of the liquid crystal layer 40) such that the light reflecting units 321 of the color filter substrate 30 are able to reflect back light emitted from the backlight module 30 to surfaces of the light reflecting units 321. Therefore, recycle and reuse of light is achieved by the backlight module 10.

In some embodiments, the substrate 31 may be transparent glass. preparation material of the light reflecting units 322 may be high reflection metal material such as Al, Ag, etc. The light absorbing units 322 may be light absorptive photoresist or light absorptive metal oxide such as MoOx.

Figure 4:
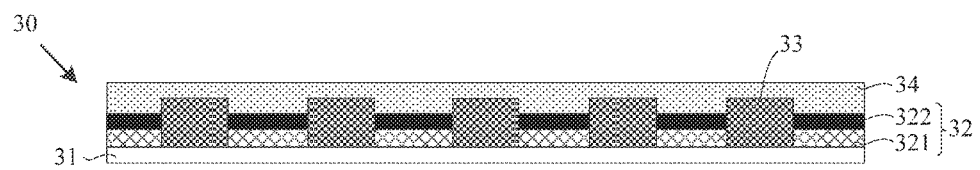
FIG. 4 is another schematic structural view of the color filter substrate of the preferred embodiment of the present invention.

In practical applications, positions of the color resist units 33 in the color filter substrate 30 may vary. Preferably, with reference to FIG. 4, FIG. 4 is another schematic structural view of the color filter substrate of the preferred embodiment of the present invention. As shown in FIG. 4, the light shielding array 32 is disposed on an upper surface of the substrate 31. The color resist units 33 are located on an upper surface of the substrate 31. The light shielding array 32 spaces the color resist units 33 apart from each other, and no gap exists between the light shielding array 32 and the color resist units 33.

In some embodiments, the color resist units 33 may comprise a plurality of red color resist units, a plurality of green color resist units and a plurality of blue color resist units arranged sequentially along the direction parallel to the substrate 31.

In practical applications, a first planarization layer 34 is disposed on the light shielding array 32 and a plurality of color resist units 33. preparation material of the first planarization layer 34 may be $SiO_x$ or $SiN_x$.

As shown in FIG. 4, in some embodiments, a thickness of the color resist units 33 may be greater than a thickness of the light shielding array 32. Of course, in some embodiments, the thickness of the color resist units 33 may be smaller than or equal to the thickness of the light shielding array 32. The present invention sets no limitations for the above embodiments.

In the detailed embodiments, the light shielding array 32 may be disposed on the substrate 31 by vapor deposition, sputtering, etc. and then be etched by photolithography. The color resist unit 33 may be formed by depositing color resist material on the substrate 31 through chemical vapor deposition (CVD) technologies, then implementing a photolithography process and an etching process. In some embodiments, a planarization layer 24 may be formed by CVD technologies.

Figure 5:
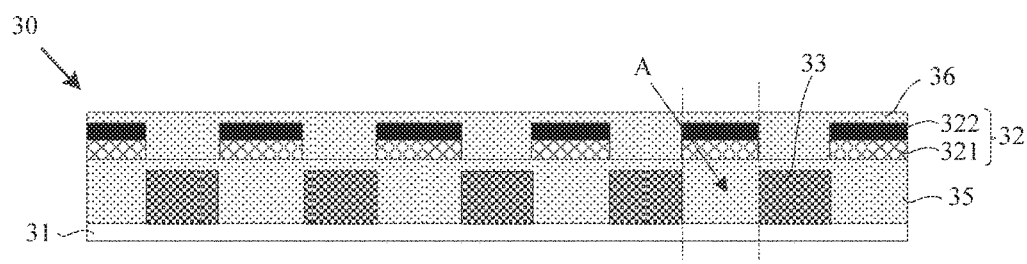
FIG. 5 is still another schematic structural view of the color filter substrate of the preferred embodiment of the present invention.

Preferably, with reference to FIG. 5, FIG. 5 is another schematic structural view of the color filter substrate of the preferred embodiment of the present invention. As shown in FIG. 5, the color resist units 33 are located on substrate 31, and two of the color resist units 33 adjacent to each other define an interval therebetween, such that a plurality of interval regions A are formed between the color resist units 33. A second planarization layer 35 is disposed on the substrate 31, and the second planarization layer 35 covers the color resist units 33 and the interval regions A. The light shielding array 32 is located on the second planarization layer 35 and covers the interval regions A. A third planarization layer 36 is disposed on the light shielding array 32 and the second planarization layer 35.

Preparation material of the first planarization layer 35 may be $SiO_x$ or $SiN_x$. Also, preparation material of the second planarization layer 36 may be $SiO_x$ or $SiN_x$.

In the embodiment of the present invention, the color filter substrate 30, the liquid crystal layer 40 and the array substrate 50 may construct a liquid crystal display panel. In practical applications, a supporting post is disposed between the color filter substrate 30 and the array substrate 50 and is located in a non-displaying zone.

Figure 6:
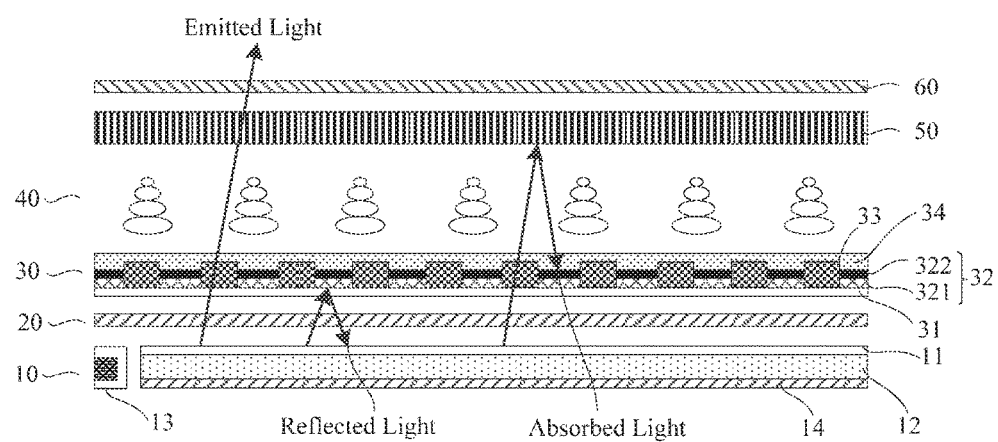
FIG. 6 is another schematic structural view of the liquid crystal display of the preferred embodiment of the present invention.

With reference to FIG. 6, FIG. 6 is another schematic structural view of the liquid crystal display of the preferred embodiment of the present invention. As shown in FIG. 6, light emitted from the backlight module 10 sequentially passes through the first polarizer 20, the substrate 31, the color resist unit 33, the planarization layer 34, the liquid crystal layer 40, the array substrate 50 and a polarizer 60 and then radiates out to the ambient environment to form a screen.

A part of the emitted light passes through the first polarizer 20 and the substrate 31 and reaches an outer surface of the light reflecting unit 321. Because of the reflective characteristics of the light reflecting unit 321, a surface of the light reflecting unit 321 reflect light back to the backlight module 10. The part of the light is reflected by the reflective plate 14 and then is emitted out from the backlight module. The light is reflected in and emitted in circulation until a part of the light passes out through the color resist unit 33.

Furthermore, a part of the emitted light sequentially passes through the first polarizer 20, the substrate 31, the color resist unit 33, the planarization layer 34 and the liquid crystal layer 40, reaches the array substrate 50 and then reflected by the array substrate 50 back to the color filter substrate 30. Because of the light absorptive characteristics color filter substrate 30 light absorbing unit 322, the part of light is absorbed to reduce light crosstalk in the liquid crystal layer 40.

As mentioned above, the LCD device provided by the present invention inverses the array substrate and the color filter substrate in the liquid crystal display panel to makes the color filter substrate face the backlight module. The light shielding array with a light reflective surface and a light absorptive surface is employed to replace the black array that only absorbs light such that light emitted from the backlight unit and passing through the light shielding array will be reflected again to reenter the backlight module to for recycle and reuse, which prevents the loss of light due to light absorption, lower the consumption of the backlight unknit and increases the usage rate of the light sources. Also, the inversed structure of the array substrate and the color filter substrate prevents issues of ambient light reflection and light crosstalk of a liquid crystal box resulted from reflection effect of a plurality of light reflecting units in the light shielding array, which enhances displaying effect of the LCD panel.

As described above, although the present invention has disclosed the preferred embodiment as above, the preferred embodiment is not intended to limit the present invention. A person of ordinary skill in the art may implement various changes and modifications without departing from the spirit and scope of the present invention. Therefore, the protection scope of the present invention is based on the scope of the claims.

What is claimed is:

1. A liquid crystal display, comprising:
a backlight module;
a color filter substrate located on a side of the backlight module having a light emitting surface, wherein a first polarizer is disposed between the color filter substrate and the backlight module;
a liquid crystal layer located on a side of the color filter substrate away from the backlight module;
an array substrate located on a side of the liquid crystal layer away from the color filter substrate, wherein a second polarizer is disposed on a side of the array substrate away from the liquid crystal layer;
wherein the color filter substrate comprises: a substrate, a light shielding array and a plurality of color resist units disposed above the substrate along a direction parallel to the substrate; a projection of the light shielding array on the substrate and a projection of the color resist units on the substrate are connected to each other without intersecting each other; the light shielding array comprises a plurality of light reflecting units and a plurality of light absorbing units, the light reflecting units configured to reflect light are disposed above the substrate, and the light absorbing units configured to absorb light are disposed on the light reflecting unit; and
wherein the backlight module is located close to a side of the color filter substrate having a substrate, such that the light reflecting units of the color filter substrate are configured to reflect light, which is emitted from the backlight module to surfaces of the light reflecting units, back to the backlight module.

2. The liquid crystal display panel as claimed in claim 1, wherein the light shielding array is located on the substrate, the color resist units are located on the substrate, and the light shielding array spaces the color resist units apart from each other.

3. The liquid crystal display panel as claimed in claim 2, wherein a first planarization layer is disposed on the light shielding array and a plurality of color resist units, and a thickness of the color resist units is greater than a thickness of the light shielding array.

4. The liquid crystal display panel as claimed in claim 1, wherein the color resist units are located on the substrate, and two of the color resist units adjacent to each other define an interval therebetween, such that a plurality of interval regions are formed between the color resist units; a second planarization layer is disposed on the substrate, and the second planarization layer covers the color resist units and the interval regions; the light shielding array is located on second planarization layer and covers the interval regions; and a third planarization layer is disposed on the light shielding array and the second planarization layer.

5. The liquid crystal display panel as claimed in claim 1, wherein the light reflecting units is made of high reflection metal material.

* * * * *